UNITED STATES PATENT OFFICE.

CHARLES E. HITE, OF BURLINGTON, NEW JERSEY, ASSIGNOR OF ONE-HALF TO WALTER PINCUS, OF PHILADELPHIA, PENNSYLVANIA.

SULFUR COMPOUND AND PROCESS OF MAKING.

Specification of Reissued Letters Patent. Reissued Sept. 1, 1914.

13,796.

No Drawing. Original No. 1,068,769, dated July 29, 1913, Serial No. 583,591. Application for reissue filed March 28, 1914. Serial No. 828,100.

*To all whom it may concern:*

Be it known that I, CHARLES E. HITE, a citizen of the United States, residing at Burlington, in the county of Burlington and State of New Jersey, have invented certain new and useful Improvements in Sulfur Compounds and Processes of Making; and I do hereby declare the following to be a full, clear, and exact description of the invention, such as will enable others skilled in the art to which it appertains to make and use the same.

My invention relates to an improved sulfur compound and the process of making same.

The object is to produce an improved compound of sulfur which shall be readily soluble in water. The improved compound contains a maximum amount of sulfur in combination with a minimum amount of fixed alkali, in the form of soluble crystals, or a soluble powder. The entire compound is completely soluble in water.

One process of making the compound is as follows: to ten pounds, for example, of flowers of sulfur or crude sulfur, preferably pulverized, is added substantially the combining weight of a fixed alkali such, for example, as an equal weight of caustic soda. The adaptation is, of course, determined in accordance with the molecular weights. Thus a smaller proportion of soda is needed than of say potash, because the atomic weight of sodium is 23 and that of potassium is 39. It may not be necessary always to have the quantities exactly proportioned, that is, an excess of one or the other may sometimes be permissible. These two ingredients are thoroughly mixed in the dry state. The mixture is now gently heated from an external source, and preferably stirred; the sulfur begins to melt and water is liberated. The temperature to which the mixture is subjected is about 212° F.; the temperature rises as the water evaporates. By the addition to this mixture of about one-half ounce of water, preferably boiling, just before heating the mixture, the starting of the chemical action is facilitated. The mass is preferably gently stirred while the action is going on. The external heat is now reduced, or withdrawn entirely to prevent excessive chemical action and waste of sulfur by vaporization. There is now, due to the reaction, a temperature sufficient to continue the process for a short time, and to evaporate part of the water present. The heat generated by the reaction is not sufficient however to continue the process to the neutralization of the alkali. Upon withdrawing the external heat for a period of time the mass starts to cool. It is now desirable in order to continue the said process of neutralization, to heat the mass again from an external source, and preferably to stir the mass. When the alkali has practically all combined with a portion of the sulfur, there results on cooling, a powdered compound, which is soluble in water.

The actual analysis of a compound made in substantial accordance with the above described method, except that slightly more water was used, gave the following result:

| | |
|---|---|
| Water of combination | 14.55% |
| Moisture | 0.29% |
| Insoluble matter | 0.13% |
| Sodium sulfite | 8.38% |
| Sodium sulfid $Na_2S$ | 28.47% |
| Sodium thiosulfate | 10.82% |
| Sodium hydroxid | 0.40% |
| Free soluble sulfur | 36.98% |

The compound above analyzed is in a solid or crystalline form which may be reduced to powder if desired. In making this product in large quantities, steam heated receptacles are used with satisfactory results. The time during which the artificial heat is necessary in neutralizing the alkali depends upon the material to be acted upon. This compound or product, has been proven in practice to be substantially free from caustic alkali, so that the compound is suitable, even in a concentrated form, when dissolved in water, for external applications upon the skin without burning or causing undue irritation. It is also suitable for spraying delicate plants without injury to same.

It has been well known in the art of chemistry that sulfur and a caustic alkali can be mixed with water, producing a chemical reaction and liberating a certain amount of heat. The amount of caustic alkali remaining in such a mixture renders it unfit for many uses, or else there is sulfur remaining in the compound, which is not soluble in water. The sulfur compound produced by my method contains a large percentage of sulfur, namely about 36.98%, as indicated in the above analysis, and is soluble in water. This compound can be used in the concentrated or crystallized state, or can be diluted to any extent with water. This compound may obviously be utilized in connection with other substances in the production or manufacture of medicines, lotions, soaps, salves or the like.

What I claim is:

1. The process which consists in mixing together approximately combining quantities by weight of powdered sulfur and a fixed alkali, subjecting the mixture to a temperature sufficiently high to evaporate a portion of the water, but not high enough to vaporize any considerable amount of the sulfur, and maintaining the mixture at the required temperature until the required chemical action has been effected, utilizing the moisture formed.

2. The process which consists in first mixing together in the dry state substantially combining weights of a fixed alkali and powdered sulfur, then, in order to facilitate the operation, adding to the mixture just sufficient water to hasten a chemical action therein, and subjecting the same to a temperature sufficiently high to evaporate a portion of the water, but not high enough to vaporize any considerable amount of the sulfur, until the required chemical action has been effected, stirring said mixture meanwhile until a fixed alkali has been practically all combined, thereby forming sodium compounds, and rendering a certain percentage of the total sulfur, which is uncombined with sodium, soluble in water.

3. A product resulting from a mixture of substantially combining parts by weight, of sulfur and fixed alkali, subjected to a temperature sufficiently high to evaporate a portion of the water, but not high enough to vaporize any considerable amount of the sulfur, in which the fixed alkali is practically all combined with a portion of the sulfur, the balance of the sulfur uncombined with a base, and the compound, including the uncombined sulfur, soluble in water.

4. A product resulting from a mixture of substantially combining parts by weight, of sulfur and fixed alkali, subjected to a temperature sufficiently high to evaporate a portion of the water, but not high enough to vaporize any considerable amount of the sulfur, which compound contains practically no uncombined alkali and a large proportion of sulfur, soluble in water, substantially as per analysis given.

5. The process which consists in mixing together combining quantities by weight of powdered sulfur and a fixed alkali, subjecting the mixture to a temperature sufficiently high to evaporate a portion of the water, but not high enough to vaporize any considerable amount of the sulfur, and maintaining the mixture at the required temperature until the required chemical action has been effected, utilizing the moisture formed.

6. The process which consists in first mixing together in a dry state substantially combining weights of a fixed alkali and powdered sulfur, then, in order to facilitate the operation, adding to the mixture just sufficient water to hasten a chemical action therein, and subjecting the same to a temperature sufficiently high to evaporate a portion of the water, but not high enough to vaporize any considerable amount of the sulfur, to continue and complete the chemical action, stirring said mixture meanwhile until the alkali has been practically all combined, thereby forming alkali metal sulfur compounds, and rendering a certain percentage of the total sulfur, which is uncombined with alkali metal soluble in water.

7. A product resulting from a mixture of substantially combining parts by weight, of sulfur and fixed alkali, subjected to a temperature sufficiently high to evaporate a portion of the water, but not high enough to vaporize any considerable amount of the sulfur, in which the alkali is practically all combined with a portion of the sulfur, the balance of the sulfur uncombined with alkali metal and the compound, including the uncombined sulfur, soluble in water.

8. A product resulting from a mixture of substantially combining parts by weight, of sulfur and fixed alkali, subjected to a temperature sufficiently high to evaporate a portion of the water, but not high enough to vaporize any considerable amount of the sulfur, which compound contains practically no uncombined alkali and approximately 36.98% of free sulfur uncombined with alkali metal and soluble in water, substantially as per analysis given.

9. The process which consists in mixing together approximately equal proportions of sulfur and caustic soda, subjecting the mixture to a temperature sufficiently high to drive off part of the water liberated but not high enough to drive off sulfur to any extent, and maintaining the mixture at the said temperature until the soda has become neutralized, utilizing in the reaction the moisture formed.

10. A product resulting from a mixture of substantially equal parts by weight, of sulfur and caustic soda, subjected to a temperature high enough to drive off some of the liberated water but not high enough to drive off sulfur, to any extent, which product contains approximately 36.98% of sulfur, and is soluble in water.

In testimony whereof, I affix my signature, in presence of two witnesses.

CHARLES E. HITE.

Witnesses:

MAE HOFMANN,

JNO. P. CROASDALE.